US007343912B2

(12) United States Patent
Jones et al.

(10) Patent No.: US 7,343,912 B2
(45) Date of Patent: Mar. 18, 2008

(54) CONVEYOR OVEN WITH IMPROVED AIR RETURN AND METHOD

(75) Inventors: Douglas Jones, New Port Richey, FL (US); Roberto Nevarez, Hudson, FL (US); William Day, New Port Richey, FL (US)

(73) Assignee: Lincoln Foodservice Products LLC, Fort Wayne, IN (US)

( * ) Notice: Subject to any disclaimer, the term of this patent is extended or adjusted under 35 U.S.C. 154(b) by 0 days.

(21) Appl. No.: 10/943,154

(22) Filed: Sep. 16, 2004

(65) Prior Publication Data

US 2005/0139203 A1 Jun. 30, 2005

Related U.S. Application Data

(60) Provisional application No. 60/503,223, filed on Sep. 16, 2003.

(51) Int. Cl.
*F24C 15/32* (2006.01)

(52) U.S. Cl. .................................. 126/21 A; 99/443 C

(58) Field of Classification Search .............. 126/21 A, 126/21 R, 41 C, 299 R; 432/145, 144; 99/443 C
See application file for complete search history.

(56) References Cited

U.S. PATENT DOCUMENTS 4,298,341 A * 11/1981 Nowack ...................... 432/64
4,960,100 A * 10/1990 Pellicane .................. 126/21 A
4,987,688 A * 1/1991 Petit et al. ...................... 34/69
5,421,320 A * 6/1995 Brown .................. 126/299 R
5,673,681 A * 10/1997 Neitzel et al. .......... 126/229 R
6,131,559 A * 10/2000 Norris et al. ............. 126/21 A
6,526,961 B1 3/2003 Hardenburger .............. 126/21
2003/0056658 A1 3/2003 Jones et al.

FOREIGN PATENT DOCUMENTS

FR 2 540 344 A1 * 8/1984

* cited by examiner

*Primary Examiner*—Josiah C. Cocks
(74) *Attorney, Agent, or Firm*—Ohlandt, Greeley, Ruggiero & Perle, L.L.P.

(57) ABSTRACT

A conveyor oven in which a heated circulating air stream provides impingement air toward a conveyor, which is turned to flow horizontally along the conveyor toward an inlet and/or an outlet thereof. The conveyor oven includes a ductwork that provides a positive pressure airflow to form the impingement air as well as a positive pressure a second air flow that intersects with the horizontal air flow with a more positive pressure adjacent the inlet and/or outlet to redirect the horizontal airflow toward an air return plenum so as to substantially reduce the escape of heat to ambient.

21 Claims, 4 Drawing Sheets

CONVEYOR OVEN WITH IMPROVED AIR RETURN AND METHOD

RELATED APPLICATION

This application claims the benefit of U.S. Provisional Patent Application Ser. No. 60/503,223, filed Sep. 16, 2003, the entire contents of which are hereby incorporated by reference.

FIELD OF THE INVENTION

This invention relates to a conveyor oven and method that has an improved heat loss performance.

BACKGROUND OF THE INVENTION

A conventional convection conveyor oven uses suction pressure to induce the hot air from within an oven chamber to upper and lower negatively pressurized plenums in fluid communication with hot air circulation fans. This method of air capture is only effective in capturing the air layers close to the surfaces of the return air plenums. Since the effective length of vacuum influence is short, air moving out horizontally near the middle of the conveyor opening is not captured and becomes lost heat via an inlet and/or an outlet of the oven chamber.

There is a need for a conveyor oven with improved heat loss performance.

SUMMARY OF THE INVENTION

A conveyor oven embodiment of the present invention comprises an oven chamber that includes an inlet and an outlet. A conveyor is disposed to transport food through the oven chamber. At least one blower is disposed to provide at least a first air stream to the oven chamber that traverses the oven chamber in a first path toward one of the inlet and outlet and a second air stream that redirects the first path of the first air stream so as to substantially prevent the first air stream from escaping to ambient via the at least one of the inlet and outlet.

In another embodiment of the conveyor oven of the present invention, at least the first air stream is heated. The redirected path avoids a substantial loss of heat to ambient.

In another embodiment of the conveyor oven of the present invention, the second air stream intersects the first air stream adjacent the at least one of the inlet and outlet.

In another embodiment of the conveyor oven of the present invention, a pressure of the second air stream is more positive than a pressure of the first air stream at a point of intersection where the first path of the first air stream is redirected.

In another embodiment of the conveyor oven of the present invention, the conveyor oven further comprises a heating chamber disposed adjacent the oven chamber and a ductwork in fluid communication with the at least one blower. The ductwork comprises an impingement plenum disposed to provide the first air stream toward the conveyor as columns of impingement air that turn into the first path along the conveyor.

In another embodiment of the conveyor oven of the present invention, the ductwork further comprises a second plenum in fluid communication with the impingement plenum to provide the second air stream.

In another embodiment of the conveyor oven of the present invention, the oven chamber comprises a tunnel oven chamber.

In another embodiment of the conveyor oven of the present invention, the second air stream intersects the first air stream adjacent the at least one of the inlet and outlet.

In another embodiment of the conveyor oven of the present invention, the conveyor oven further comprises a heating chamber disposed adjacent the oven chamber and a ductwork in fluid communication with the at least one blower. The ductwork comprises an impingement plenum disposed to provide the first air stream toward the conveyor as columns of impingement air that turn into the first path along the conveyor.

In another embodiment of the conveyor oven of the present invention, the ductwork further comprises a second plenum in fluid communication with the impingement plenum to provide the second air stream.

In another embodiment of the conveyor oven of the present invention, the ductwork comprises a plurality of impingement plenums disposed on either side of the conveyor. The second plenum is in fluid communication with one of the plurality of impingement plenums.

In another embodiment of the conveyor oven of the present invention, the ductwork is shaped to provide the first air stream in the first path toward the inlet, a third air stream in the tunnel oven chamber along a third path toward the outlet, and a fourth air stream that redirects the third path of the third air stream so as to substantially reduce the third air stream from escaping to ambient via the other of the inlet and outlet.

In another embodiment of the conveyor oven of the present invention, an additional blower is in fluid communication with the ductwork.

In another embodiment of the conveyor oven of the present invention, the ductwork further comprises a plurality of impingement plenums disposed to provide the first and third air streams.

In another embodiment of the conveyor oven of the present invention, the ductwork further comprises first and second plenums disposed in fluid communication with two of the impingement plenums to provide second and fourth air streams, respectively.

In another embodiment of the conveyor oven of the present invention, the impingement plenums are disposed above and below the conveyor.

In another embodiment of the conveyor oven of the present invention, the impingement plenums are disposed to provide first and second cooking regions within the tunnel oven chamber.

In another embodiment of the conveyor oven of the present invention, at least the first air stream is heated. A substantial loss of heat to ambient is avoided by the redirected first path.

In another embodiment of the conveyor oven of the present invention, the second air stream is also heated.

In another embodiment of the conveyor oven of the present invention, the second air stream intersects the first air stream adjacent the at least one of the inlet and outlet.

In another embodiment of the conveyor oven of the present invention, a pressure of the second air stream is more positive than a pressure of the first air stream at a point of intersection where the first path of the first air stream is redirected.

In a method embodiment of the present invention, a first air stream and a second air stream are provided in an oven chamber of a conveyor oven The first air stream is directed in a first path that traverses the oven chamber toward at least one of an inlet and an outlet of the oven chamber. The first path of the first air stream is redirected with the second air stream so as to substantially prevent the first air stream from escaping to ambient via the at least one of the inlet and outlet.

In another method embodiment of the present invention, the second air stream intersects the first air stream adjacent the at least one of the inlet and outlet.

In another method embodiment of the present invention, the conveyor oven further comprises a conveyor that extends through the oven chamber via the inlet and the outlet and a ductwork that comprises an impingement plenum disposed to provide the first air stream toward the conveyor as columns of impingement air that turn into the first path.

In another method embodiment of the present invention, the ductwork further comprises a second plenum in fluid communication with the impingement plenum to provide the second air stream.

In another method embodiment of the present invention, the ductwork comprises a plurality of impingement plenums disposed on either side of the conveyor. The second plenum is in fluid communication with one of the plurality of impingement plenums.

In another method embodiment of the present invention, at least the first air stream is heated, and wherein a substantial loss of heat to ambient is avoided by the redirected first path.

In another method embodiment of the present invention, the second air stream is also heated.

In another method embodiment of the present invention, the second air stream intersects the first air stream adjacent the at least one of the inlet and outlet.

In another method embodiment of the present invention, a pressure of the second air stream is more positive than a pressure of the first air stream at a point of intersection where the first path of the first air stream is redirected.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

Figure 1:
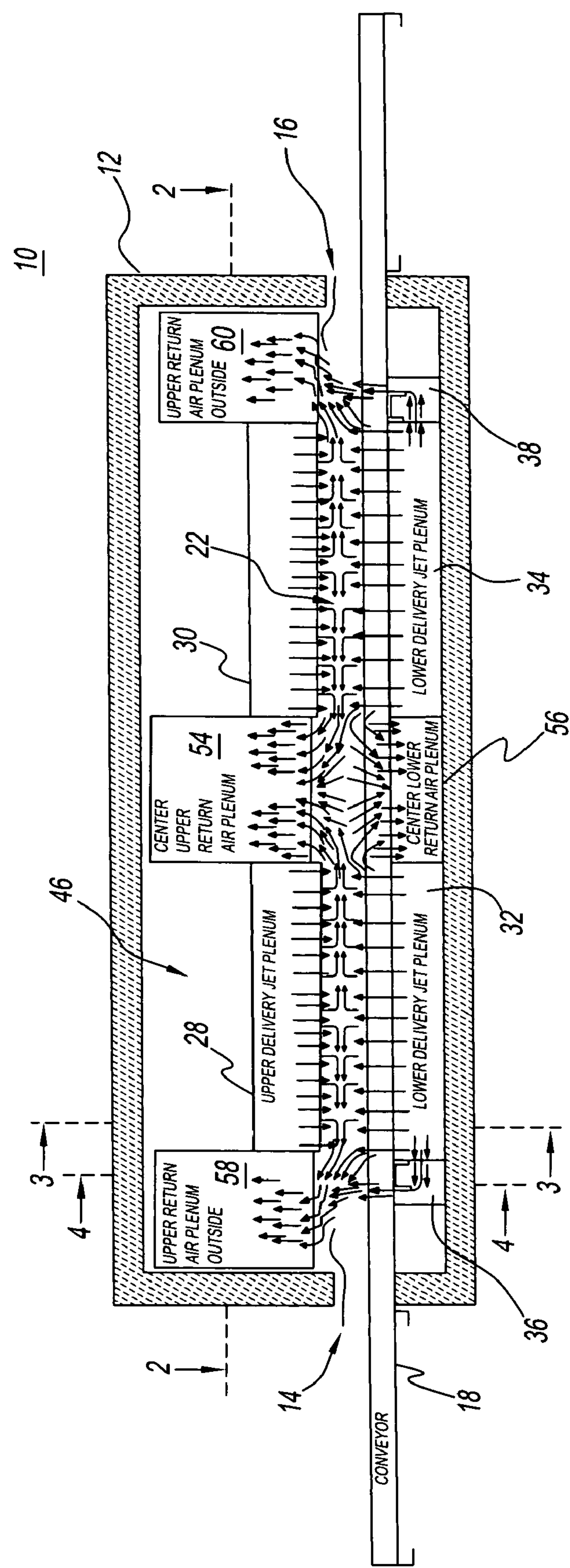
FIG. 1 is a sectional view in elevation of a conveyor oven of the present invention.
Figure 2:
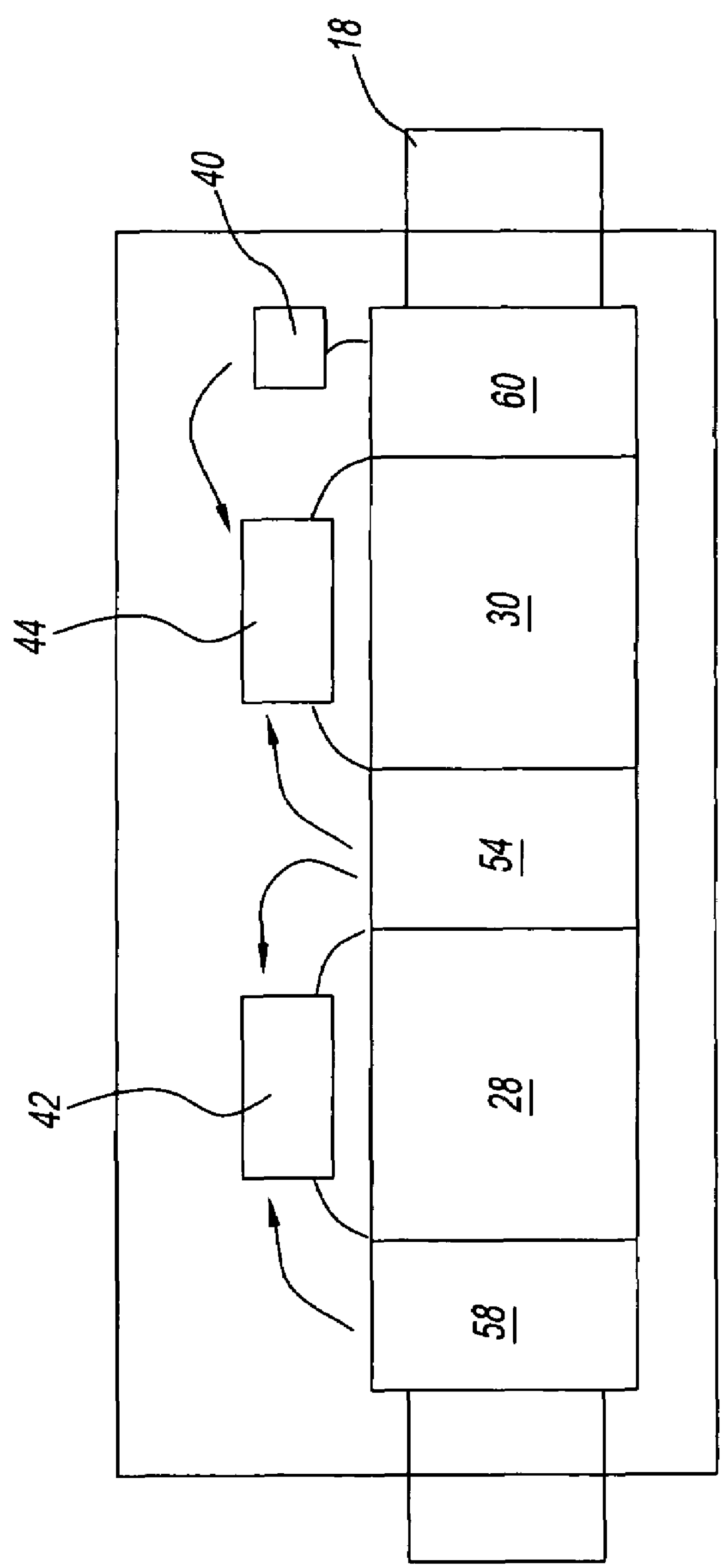
FIG. 2 is a sectional view taken along line 2-2 of FIG. 1.

Referring to FIGS. 1-4, a conveyor oven 10 includes a housing 12 that includes an oven chamber 22 and a heating chamber 24. A divider 26 (shown in FIG. 3) that is disposed in housing 12 separates oven chamber 22 from heating chamber 24. Oven chamber 22 includes an inlet 14 at one end and an outlet 16 at the other end. A conveyor 18 is disposed within oven chamber 22 so as to extend through inlet 14 and outlet 16.

Conveyor 18 is driven by any suitable motive device and linkage to convey food through oven chamber 22 in a direction to enter via inlet 14 and exit via outlet 16. Conveyor 22 preferably includes a perforate surface that allows an air stream to pass through. For example, conveyor 18 may suitably be of the type described in U.S. patent Publication No. US-2003-0056658-A1 dated Mar. 27, 2003, which is hereby incorporated in its entirety by reference.

A heater 40, a blower 42 and a blower 44 are disposed in heating chamber 24 to provide via a ductwork 46 a heated air stream that circulates between oven chamber 22 and heating chamber 24. Heater 40 can be any suitable heater known to those skilled in the art for heating air streams in ovens. For example, heater 40 is shown as a gas heater in FIGS. 3 and 4. In alternate embodiments, heater 40 may be an electrical heater.

Blowers 42 and 44 may be any suitable blower known to those skilled in the art for circulating air in an oven. For example, blower 42 is shown as a radial blower in FIGS. 3 and 4. In alternate embodiments, heater 42 may be an axial blower.

Ductwork 46 includes divider 26, an upper plenum 28, an upper plenum 30, a lower plenum 32, a lower plenum 34, a plenum 36 and a plenum 38.

Upper plenum 28 and lower plenum 32 are disposed in oven chamber 22 on opposite sides of conveyor 18 above and below one another. Upper plenum 28 and lower plenum 32 extend through divider 26 to be in fluid communication with blower 42. Upper plenum 30 and lower plenum 34 are disposed in oven chamber 22 on opposite sides of conveyor 18 above and below one another. Upper plenum 30 and lower plenum 34 extend through divider 26 to be in fluid communication with blower 44.

Figure 3:
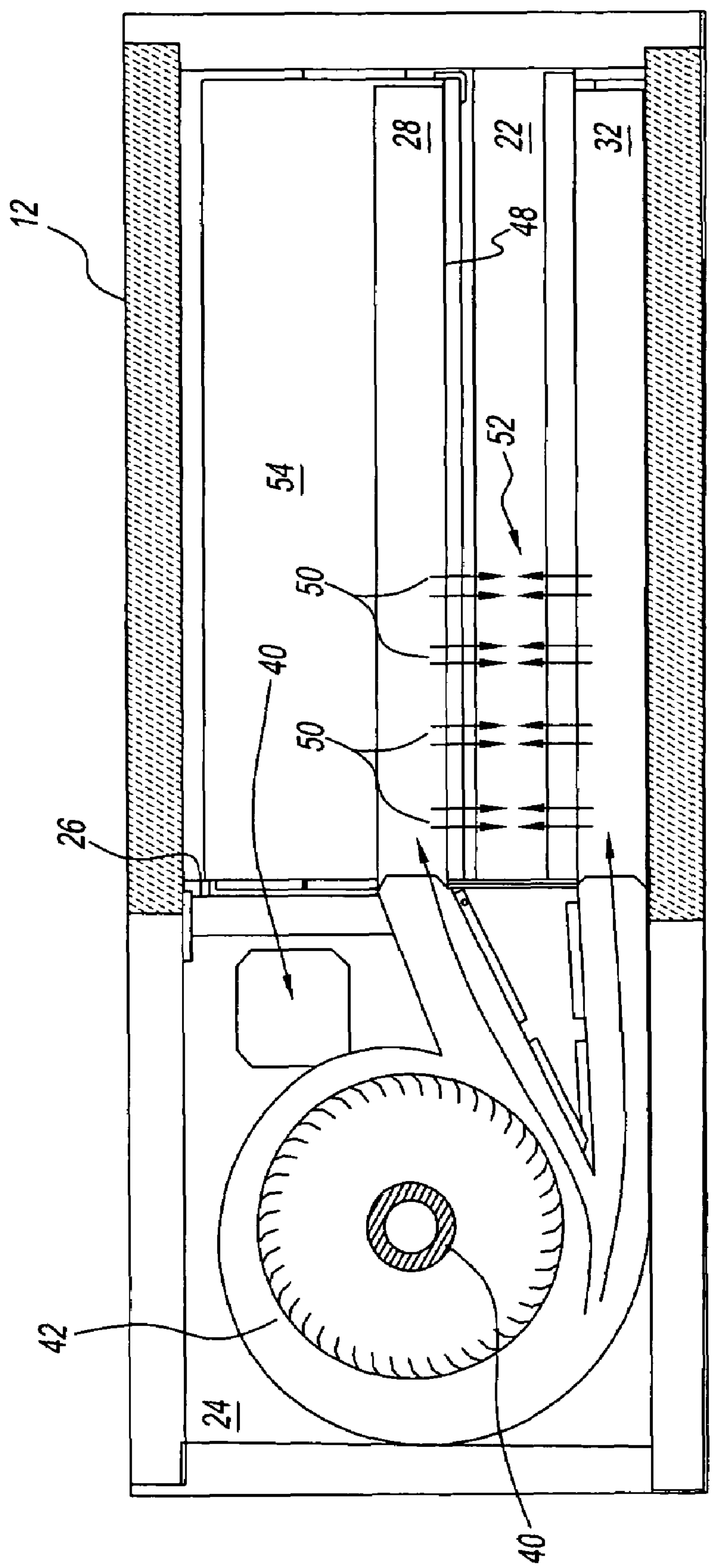
FIG. 3 is a sectional view taken along line 3-3 of FIG. 1.

Upper plenums 28 and 30 and lower plenums 32 and 34 each have a surface that faces conveyor 18 and that comprises a plurality of delivery openings to deliver air toward conveyor 18. For example, upper plenum 28 is shown in FIG. 3 to have a surface 48 with a plurality of openings 50 that face conveyor 18. Preferably, openings 50 are shaped to provide columns 52 of impingement air. For example, openings 50 may include any of the openings described in the above mentioned U.S. patent Publication No. US-2003-0056658-A1.

Figure 4:
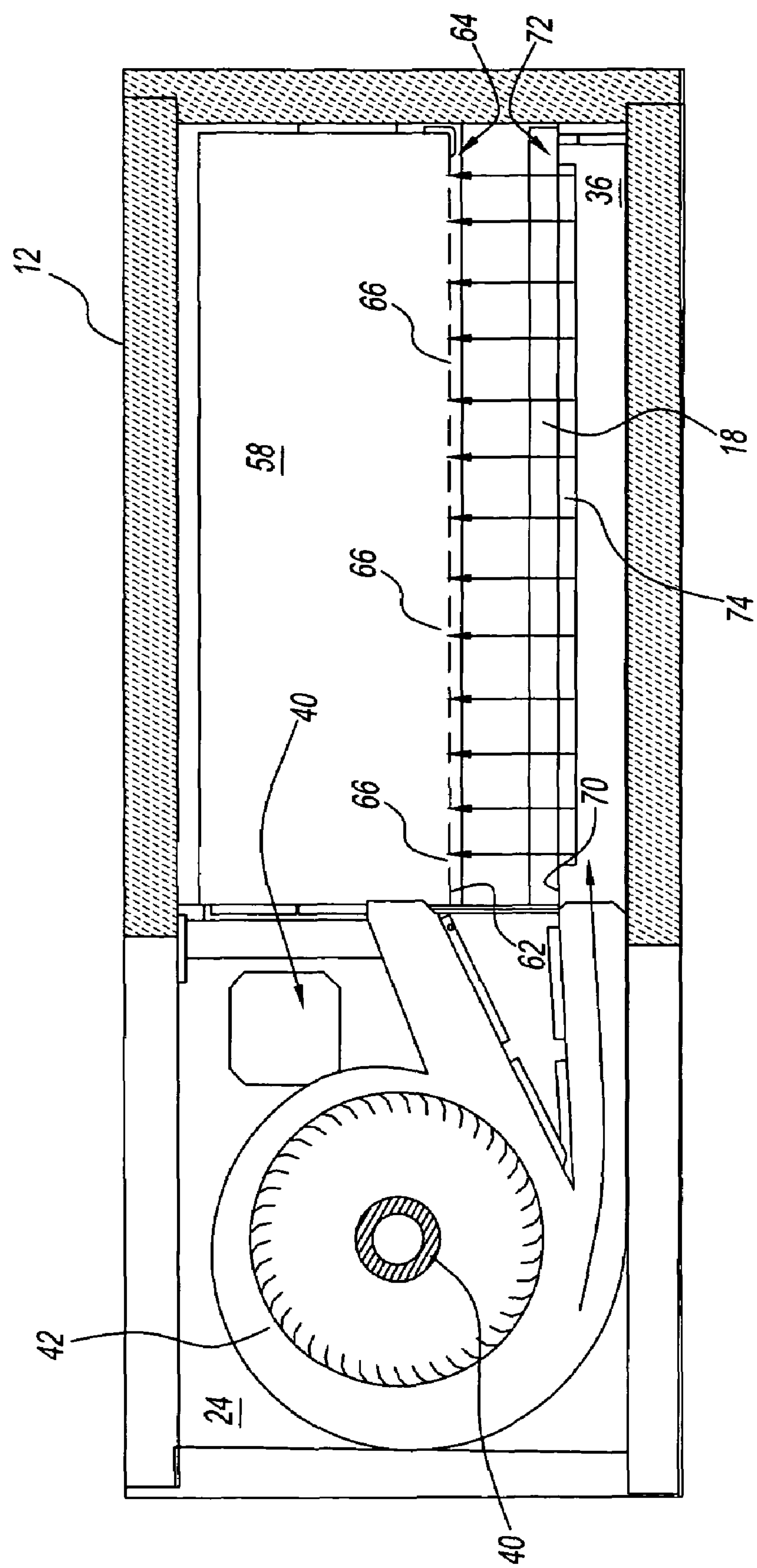
FIG. 4 is a sectional view taken along line 4-4 of FIG. 1.

An upper central air return plenum 54 and a lower central air return plenum 56 are disposed between upper plenums 28 and 30 and lower plenums 32 and 34, respectively. An upper inlet air return plenum 58 is disposed to the inlet side of upper plenum 28 and an upper outlet air return plenum 60 is disposed to the outlet side of upper plenum 30. Upper inlet and outlet air return plenums 58 and 60 each include a surface that faces conveyor 18 and that has a port for a return flow of air. For example, upper outlet air return plenum 58 is shown in FIG. 4 as including a surface 62 that has a port 64 with one or more openings 66 for return air flow.

Blowers 42 and 44 are operable to provide an air stream that circulates between oven chamber 22 and heating chamber 24. The circulating air flows from blower 42 under positive pressure through upper and lower plenums 28 and 32 and returns via upper inlet return plenum 58 and upper and lower central air return plenums 54 and 56. The circulating air also flows from fan 44 under positive pressure through upper and lower plenums 30 and 34 and returns via upper outlet return plenum 60 and upper and lower central air return plenums 54 and 56. The circulating return air is heated by heater 40 to a predetermined oven temperature. The impingement air provided by upper and lower plenums 28 and 32 merge above conveyor 18 and turn toward inlet 14 and upper and lower central return plenums 54 and 56. The impingement air provided by upper and lower plenums 30 and 34 merge above conveyor 18 and turn toward outlet 16 and upper and lower central return plenums 54 and 56.

Ideally, all of the circulating air moving toward inlet 14 and outlet 16 would be sucked into upper return air plenums 58 and 60, respectively. However, some of the heated air stream tries to escape via inlet 14 and outlet 16 toward the lower pressure ambient. Also, as the air streams traverse paths along conveyor 18 their pressure decreases as they approach inlet 14 or outlet 16.

In order to more efficiently capture the heated air trying to escape from inlet 14 and outlet 16, a positively pressurized stream of oven temperature air is forced out of ports located adjacent inlet 14 and outlet 16. These positively pressurized air streams intersect the air streams in the paths along conveyor 18 at an angle so as to redirect the airflow along conveyor 18 toward upper air return plenums 58 and 60. Preferably the angle is about 90°.

The positively pressurized stream of heated air is provided by lower plenums 36 and 38 disposed adjacent inlet 14 and outlet 16. Lower plenums 36 and 38 are in fluid communication with lower plenums 32 and 34, respectively. For example, lower plenums 36 may be extensions of lower plenums 32 and 34, respectively. In one alternate embodiment, lower plenums 36 and 38 could have fluid communication with respective lower plenums 32 and 34 via connecting ports. In another alternate embodiment, lower plenums 36 and 38 could be separate from lower impingement plenums 32 and 34 could be supplied with positively pressurized air from blowers 42 and 44 or from one or more additional blowers.

The pressure of the air streams provided by lower plenums 36 and 38 at the points of intersection is more positive than the pressures of the air streams traversing the paths along conveyor 18 toward inlet 14 and outlet 16. This enhances the ability to redirect the paths toward upper return plenums 58 and 60.

Preferably, plenums 36 and 38 are substantially identical so only plenum 36 will be described in detail. Plenum 36 includes a surface 70 with a port 72 through which a portion of the positively pressurized circulating air stream passes upwardly through conveyor 18 to intersect with and redirect the airflow along conveyor 18 from the horizontal to the vertical so as to enter upper inlet return plenum 58. This forces the hot oven air up closer to openings 66 of upper inlet air return plenum 58 where the vacuum pressure zone is able to capture the escaping hot oven air more efficiently. That is, the redirection of heat substantially reduces heat from escaping to ambient via inlet 14. The vertical positive pressured hot air stream also serves as a pre and post bottom heat boost to the food product being conveyed over the port. This improves bottom heat transfer and thereby increases cooking speed. Similarly, plenum 38 provides a positively pressurized circulating air stream that passes upwardly through conveyor 18 to intersect with and redirect the airflow along conveyor 18 from the horizontal to a more vertical direction so as to enter upper outlet return plenum 60.

Port 72 includes at least one opening 74 that may have any suitable shape. For example, opening 74 may suitably be a slot. Alternately, port 72 may include a plurality of openings 74.

The present invention having been thus described with particular reference to the preferred forms thereof, it will be obvious that various changes and modifications may be made therein without departing from the spirit and scope of the present invention as defined in the appended claims.

What is claimed is:

1. A conveyor oven comprising:

an oven chamber that comprises an inlet and an outlet;

a conveyor disposed to transport food through said oven chamber;

a ductwork that comprises first, second and third separate air return plenums, wherein said first and second air return plenums are located adjacent said inlet and outlet, respectively, and said third air return plenum is located between said first and second air return plenums, wherein said ductwork further comprises first and second air delivery plenums located on one side of said conveyor between said third air return plenum and said first and second air return plenums, respectively; and at least one blower disposed to provide a first air stream via said first air delivery plenum along said conveyor between said first and third air return plenums, a second air stream via said second air delivery plenum along said conveyor between said first and third air return plenums, a third air stream and a fourth separate air stream that redirect said first and second air streams to said first and second air return plenums, respectively, so as to substantially prevent said first and second air streams from escaping to ambient via said inlet and said outlet, respectively.

2. The conveyor oven of claim 1, wherein at least said first air stream is heated, and wherein a substantial loss of heat to ambient is avoided by said redirected first air stream.

3. The conveyor oven of claim 1, wherein said third and fourth air streams intersects said first and second air streams adjacent said inlet and said outlet, respectively.

4. The conveyor oven of claim 1, wherein a pressure of said third and fourth air streams is more positive than a pressure of said first and second air streams at points of intersection where said first and second air streams are redirected.

5. The conveyor oven of claim 1, further comprising a heating chamber disposed adjacent said oven chamber in fluid communication with said at least one blower, and wherein said first and second air delivery plenums provide said first and second air streams toward said conveyor as columns of impingement air that turn along said conveyor.

6. The conveyor oven of claim 1, wherein said oven chamber comprises a tunnel oven chamber.

7. The conveyor oven of claim 6, wherein said third air stream intersects said first air stream adjacent said inlet.

8. The conveyor oven of claim 6, further comprising a heating chamber disposed adjacent said oven chamber in fluid communication with said at least one blower, and wherein said first and second air delivery plenums provide said first and second air streams toward said conveyor as columns of impingement air that turn along said conveyor.

9. The conveyor oven of claim 8, wherein said ductwork further comprises a plurality of impingement plenums disposed on an opposite side of said conveyor.

10. The conveyor oven of claim 1, further comprising an additional blower in fluid communication with said ductwork.

11. The conveyor oven of claim 6, wherein said first and second plenums are disposed to provide first and second cooking regions within said tunnel oven chamber.

12. The conveyor oven of claim 6, wherein at least said first air stream is heated, and wherein a substantial loss of heat to ambient is avoided by said redirected first air stream.

13. The conveyor oven of claim 12, wherein said second air stream is also heated.

14. The conveyor oven of claim 6, wherein a pressure of said third air stream is more positive than a pressure of said first air stream at a point of intersection where said first air stream is redirected.

15. A method for a conveyor oven that comprises a conveyor disposed to convey food between an inlet and an outlet, first and second separate air return plenums disposed adjacent said inlet and outlet, respectively, a third separate air return plenum disposed between said first and second air return plenums, said method comprising:

providing a first air stream and a second air stream along said conveyor between said third air return plenum and said first and second air return plenums, respectively;

directing a portion of said first air stream and a portion of said second air stream toward said inlet and said outlet, respectively; and providing third and fourth air streams that redirect said portions of said first and second air streams to said first and second air return plenums, respectively, so as to substantially prevent said portions of said first and second air streams from escaping to ambient via said inlet and said outlet, respectively.

16. The method of claim 15, wherein said third and fourth air streams intersect said first and second air streams adjacent said inlet and said outlet, respectively.

17. The method of claim 15, wherein said conveyor oven further comprises a ductwork that comprises first and second impingement plenums disposed to provide said first and second air streams, respectively, toward said conveyor as columns of impingement air that turn along said conveyor.

18. The method of claim 17, wherein said first and second impingement plenums are disposed on a first side of said conveyor, wherein said ductwork further comprises a plurality of impingement plenums disposed on an opposite side of said conveyor.

19. The method of claim 15, wherein at least said first air stream is heated, and wherein a substantial loss of heat to ambient is avoided by said redirected first air stream.

20. The method of claim 19, wherein said second air stream is also heated.

21. The method of claim 15, wherein a pressure of said third air stream is more positive than a pressure of said first air stream at a point of intersection where said first air stream is redirected.

* * * * *